United States Patent [19]
Fox

[11] 3,844,581
[45] Oct. 29, 1974

[54] INFLATABLE SAFETY BELT AND HEAD BAG

[75] Inventor: John William Fox, Ashtead, England

[73] Assignee: Project Laboratories Limited, London, England

[22] Filed: Apr. 25, 1972

[21] Appl. No.: 247,492

[30] Foreign Application Priority Data
Feb. 7, 1972 Great Britain .................... 5629/72

[52] U.S. Cl. .................. 280/150 AB, 9/316, 9/340, 280/150 SB, 280/150 B, 297/389
[51] Int. Cl. ............................................ B60r 21/08
[58] Field of Search .... 280/150 AB, 150 SB, 150 B; 297/384, 389; 9/316, 340

[56] References Cited
UNITED STATES PATENTS
731,314  6/1903  Malmqvist ............................ 9/340
3,430,979  3/1969  Terry et al. ................... 280/150 AB
3,510,150  5/1970  Wilfert ......................... 280/150 AB
3,682,498  8/1972  Rutzki .......................... 280/150 AB
3,706,463  12/1972  Lipkin .......................... 280/150 AB FOREIGN PATENTS OR APPLICATIONS
1,431,098  1/1966  France ........................... 280/150 AB Primary Examiner—David Schonberg
Assistant Examiner—John P. Silverstrim
Attorney, Agent, or Firm—Sughrue, Rothwell, Mion, Zinn & Macpeak

[57] ABSTRACT

An inflatable head bag is mounted in a vehicle in the collapsed condition adjacent the head region of an occupant of the vehicle. The bag is connected to a source of compressed gas so that, in the event of an accident, the bag may be rapidly inflated and provide a protective cushion for the occupant's head. The bag may be shaped with a recess so as to fit around part of the head when inflated.

5 Claims, 5 Drawing Figures

PATENTED OCT 29 1974　　3,844,581
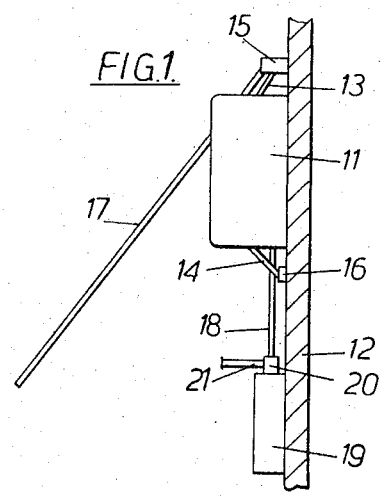
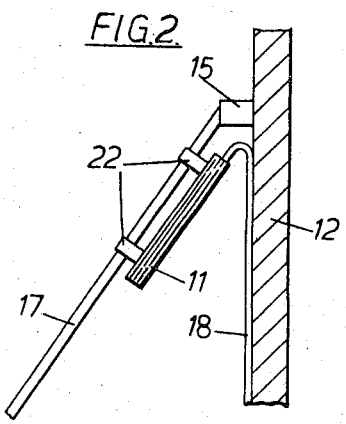
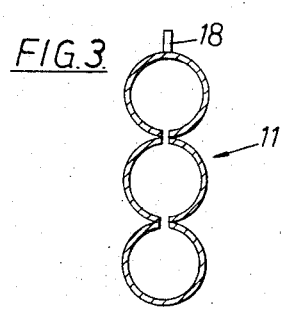
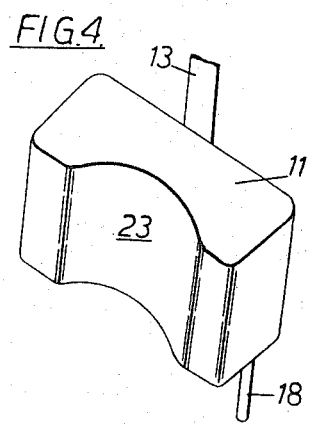
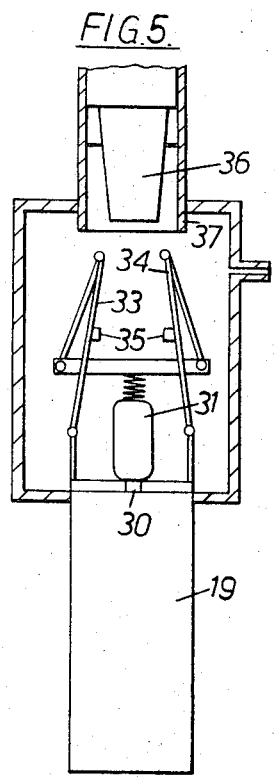

3,844,581

INFLATABLE SAFETY BELT AND HEAD BAG

BACKGROUND OF THE INVENTION

The invention relates to a vehicle safety device and provides an improved head protecting device. Such safety devices may be used on any type of motor vehicle, and, although they are particularly useful in motor cars, they may also be used in aeroplanes.

Various safety devices have been tried for protecting passengers in a vehicle in the event of an accident. Such devices have included cushion padding head rests. Cushion padding is generally unsatisfactory in that it is very bulky and alters the accommodation provided within the car. Conventional head rests, although padded, are necessarily formed of substantially rigid material in order to provide the necessary support. Furthermore, they are located behind the occupant and while providing some degree of protection from an impact at the rear of the vehicle, they provide little or no protection at the side of the occupant's head. It has not been possible to provide protection for the side of the head with a conventional head rest without severely limiting access to the occupant's seat.

SUMMARY OF THE INVENTION

It is an object of the present invention to provide a separate inflatable head bag for mounting in a vehicle so as to provide protection for an occupant's head. By use of an inflatable bag, the bag may be located where desired, including for example at the side of the occupant's head, without hindering access to the seat.

The present invention provides an inflatable head bag formed as a separate unit and adapted to be mounted in a vehicle in the collapsed condition adjacent the head region of an occupant of the vehicle the bag including means for connection to a supply of compressed gas for inflating the bag in the event of a sudden change in the speed or direction of vehicle movement.

The invention includes an inflatable head bag as aforesaid, together with a source of compressed gas controlled by a valve responsive to sudden change in speed or direction of vehicle movement.

The bag may conveniently be mounted on the side wall of a motor vehicle or mounted on the upper part of a diagonal type of seat belt. As a further alternative, the bag may be mounted on part of a car or car seat so as to lie behind the head of the occupant.

The bag may be shaped with a recess into which part of the head may fit when the bag is inflated, thereby providing extended protection around the head and resisting movement of the head off the bag.

The invention includes a vehicle having such an inflatable head bag mounted in position.

BRIEF DESCRIPTION OF THE DRAWINGS

FIG. 1 is a schematic view of one embodiment of the invention with the head bag in the inflated condition, FIG. 2 shows an alternative embodiment with the head bag deflated, FIG. 3 is a section through one construction of head bag in the inflated condition, FIG. 4 is a perspective view of an alternative form of head bag in the inflated condition, and FIG. 5 shows one valve mechanism for controlling a supply of compressed air for use with the head bag.

DESCRIPTION OF THE PREFERRED EMBODIMENTS

Each of these examples shows an inflatable head bag formed as a separate unit for mounting in a motor vehicle in the collapsed condition adjacent the head region of an occupant of the vehicle. The interior of the bag is connected to a source of compressed gas controlled by a valve responsive to sudden change in speed or direction of vehicle movement so that, in the event of an accident, the head bag is inflated and gives protection to the occupant's head.

In FIG. 1, a hollow head bag 11 is shown in the inflated condition. The bag 11 is mounted on the side pillar 12 of a motor car by strap members 13 and 14 fixed to upper and lower mountings 15 and 16 on the pillar 12. The upper pillar 15 also supports the upper end of a diagonal seat belt 17. The bag 11 has a gas inlet pipe 18 connecting the interior of the bag with a compressed air bottle 19 having a gas release valve 20. The bottle 19 and release valve 20 may be in the form shown in FIG. 5. The seat belt 17 may comprise a hollow inflatable strap member as described and claimed in my copending U.S. Pat. application Ser. No. 247,491 filed on Apr. 25, 1972 with the title "SAFETY BELT" and based on British Pat. application No. 53014/71. In this case, the bottle 19 may have a second outlet pipe 21 connected to the seat belt so that the belt 17 and bag 11 are simulatneously inflated from the same source. The height at which the bag 11 is mounted is adjusted so that the bag lies at the side of the occupant's head and prevents the head hitting the side of the car in the event of an accident.

In normal use, the bag 11 is either rolled up or folded away in a pleated condition so as to take up as little room as possible. The bag may be rolled or pleated about a vertical or a horizontal axis depending on the particular location of the bag.

The arrangement shown in FIG. 2 is generally similar, and the same reference numerals have been used for similar parts. In this case, the bag 11 is shown in the folded deflated condition and is mounted on the diagonal belt 17 by two clips or straps 22 fitting over the upper part of the belt 17.

The bag 11 may be formed of suitably reinforced elastic material. It may be of cellular construction as shown in FIG. 3, each chamber being interconnected for inflation from the common inlet pipe 18. Alternatively the bag may be provided with internal ties or diaphragms to ensure that it inflates to the correct shape. The bag 11 is preferably shaped to provide optimum head protection. In the form shown in FIG. 4, the bag, when inflated, is of generally rectangular shape with a recess 23 provided in the wall facing the occupant's head, so that, in the event of an accident, the bag 11 partly envelopes the side of the head and prevents the head rolling off the bag. The particular example shown in FIG. 4 is intended for mounting on a side pillar of a car, preferably folded or rolled about a vertical axis. A mounting strap 13 is shown for fixing to an upper support and a similar lower strap (not shown) is also provided to ensure correct position of the bag when inflated.

One arrangement for controlling the valve on the compressed air bottle 19 is shown in FIG. 5. In this case, an opening 30 in one wall of the bottle is closed by a spring urged valve closure member 31. The valve closure member 31 is normally kept in the closed position by an over centre toggle arrangement comprising four pivoted arms. In the closed position, the arms 33 and 34 abut against stop members 35 to prevent the arms passing too far over centre. In order to open the valve, a wedge member 36 is slidably located in a guide tube 37 so that on sudden deceleration, such as occurs in an accident, the wedge member 36 slides out of the tube 37 and into position between the arms 33 and 34. It will be understood that the valve mechanism is in this case arranged with the axis of movement of the wedge member 36 lying horizontally in the direction of movement of the vehicle. Forward movement of the wedge 36 pushes the arms 33 and 34 outwardly until the toggle mechanism passes over centre and allows the air pressure within the container 19 to force the closure member 31 upwardly and release the compressed air to inflate the head bag 11. In cases where an inflatable seat belt is connected to the same container 19, the belt will be simultaneously inflated.

The invention is not limited to the details of the foregoing examples. For instance, the bag 11 may be connected to a gas supply bottle separate from the bottle used to inflate the belt 17. The bag 11 may be used with or without any safety belt. The bag 11 may be mounted within a net fixed to the vehicle and the net may control the shape of the bag when inflated. The bag may be mounted behind the occupant's head, e.g. on the back of the occupant's seat so as to protect the back of the occupant's head.

It will be appreciated that in all the above examples, the bag when inflated is of relatively small volume compared with the spaced around the occupant within the vehicle. The bag may be quickly and simply inflated, and, if the bag should inflate accidently, no loss of vision occurs as the bag is at all times mounted out of the line of forward vision of the occupant.

I claim:

1. A vehicle safety system for protecting the occupant of a vehicle in the event of an accident, said system comprising:
   1. an inflatable strap member comprising a diagonal safety belt adapted to be secured at its ends and to extend across an occupant of the vehicle so as to restrain the occupant in position in the event of an accident;
   2. an inflatable head bag mounted on said diagonal safety belt at a position adjacent one side of the head position, said inflatable head bag being formed as a separate unit and being adapted to be normally in the collapsed condition;
   3. a source of compressed gas;
   4. valve means for controlling the supply of gas from said source, said valve means being arranged to respond to vehicle impact to release gas from said source;
   5. a first connecting passage connecting said source of gas to said inflatable head bag; and
   6. a second connecting passage connecting said source of gas to said inflatable strap member.

2. A vehicle safety system as claimed in claim 1 in which the bag is shaped with a recess into which part of the head may fit when the bag is inflated, thereby providing extended protection around the head and resisting movement of the head off the bag.

3. A vehicle safety system according to claim 1 wherein the head bag is of cellular construction having a plurality of interconnected inflatable chambers.

4. A vehicle safety system for protecting the occupant of a vehicle in the event of an accident, said system comprising:
   1. an inflatable strap member adapted to be secured at its ends and to extend across an occupant of the vehicle so as to restrain the occupant in position in the event of an accident;
   2. an inflatable head bag formed as a separate unit and adapted to be mounted in a vehicle on a side wall at a position adjacent one side of the head position, said inflatable bag being adapted to be normally in the collapsed condition, said inflatable bag being shaped with a recess into which part of the head may fit when the bag is inflated, thereby providing extended protection around the head and resisting movement of the head off the bag;
   3. a source of compressed gas;
   4. valve means for controlling the supply of gas from said source, said valve means being arranged to respond to vehicle impact to release gas from said source;
   5. a first connecting passage connecting said source of gas to said inflatable head bag; and
   6. a second connecting passage connecting said source of gas to said inflatable strap member.

5. A vehicle safety system according to claim 4 wherein the head bag is of cellular construction having a plurality of interconnected inflatable chambers.

* * * * *